United States Patent [19]

Lin

[11] 3,956,261

[45] May 11, 1976

[54] LIGNIN ADDUCTS

[75] Inventor: Stephen Y. Lin, Mt. Pleasant, S.C.

[73] Assignee: Westvaco Corporation, New York, N.Y.

[22] Filed: Oct. 10, 1975

[21] Appl. No.: 621,466

[52] U.S. Cl. .................... 260/124 A; 260/124 R; 252/549; 252/170
[51] Int. Cl.² ...................................... C07G 1/00
[58] Field of Search ......... 260/124 A, 124 B, 124 R

[56] References Cited
UNITED STATES PATENTS
2,758,990   8/1956   Lipsitz ........................... 260/124 A Primary Examiner—Lewis Gotts
Assistant Examiner—D. R. Phillips
Attorney, Agent, or Firm—Richard L. Schmalz; Ernest B. Lipscomb, III

[57] ABSTRACT

Disclosed herein are lignin adducts of the formula

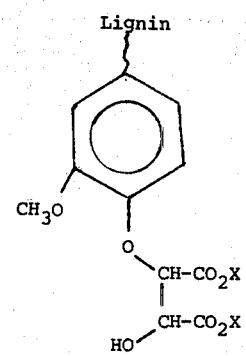

wherein X is an alkali metal cation, such as sodium, potassium and lithium. These lignin adducts are made by reacting an alkali lignin or sulfonated lignin with up to 10 moles of a salt of epoxysuccinate at a temperature of from 50°C. to 150°C. The lignodicarboxylic acid and its salts are useful as a dispersant and metal complexing agent.

6 Claims, No Drawings

LIGNIN ADDUCTS

BACKGROUND OF THE INVENTION

1. Field of the invention

This invention relates to dicarboxylic acid adducts of lignin. More particularly, this invention relates to adducts of lignin and a salt of epoxysuccinate.

Lignin which is employed in the present invention is a complex naturally-occurring solid polymer comprising a group of closely related compounds. The major commercial source of lignin is from the wood pulping industry. The structures of commercial lignin materials vary according to their isolation method and their source. The lignin varies according to its source, such as tree or plant source, and to the treatment it underwent to be separated from cellulose.

2. The Prior Art

Numerous modifications have been made to lignin in order to improve certain properties, such as dispersing ability, flocculating ability, flame retardancy, thermoplasticity, tanning properties and the like.

Although lignin derivatives with improved properties have been prepared by treatment of alkali lignin, none of these derivatives has proven to have as great effectiveness in both dispersing and metal complexing properties as is desirable. This is particularly true with regard to calcium sequestering capacity of lignin. However, polycarboxylic compounds with certain structural configurations are known to be good calcium sequestrants and have been widely used in detergent building and other applications. Among them, the most important are citric acid, ethylenediaminotetraacetic acid (EDTA) and nitrilotriacetic acid (NTA). A general structural feature of these compounds is that the polycarboxylic groups in a molecule are coupled with an electron-rich element, such as oxygen or nitrogen, in the manner expressed by the formula

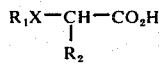

wherein $R_1$, $R_2$ = hydrogen, alkyl or aliphatic carboxylic group; and X = oxygen or nitrogen.

The invention described herein is a lignin adduct which satisfies the above structural requirement for a molecule to be an effective calcium sequestrant. By virtue of its carboxylic nature and water solubility, the product is particularly useful as a dispersant and oil-in-water emulsifier.

It is, therefore, the general object of this invention to provide a lignin dicarboxylic acid.

Another object of this invention is to provide a lignin-derived metal complexing agent, in particular, for calcium.

A further object of this invention is to provide a water-soluble lignocarboxylate useful as a dispersant.

Other objects, features and advantages of this invention will be evident from the following detailed description.

SUMMARY OF THE INVENTION

The lignin adducts of this invention comprises the reaction product of an alkali lignin or a sulfonated lignin with up to 10 moles, preferably 2 to 5 moles, of sodium epoxysuccinate per 1,000 grams of lignin, said epoxysuccinate being an epoxidized compound derived from reacting hydrogen peroxide with maleic anhydride or maleic acid. The alkali lignin adducts are water-soluble, and already water-soluble sulfonated lignins have improved color and metal complexing ability. These lignin dicarboxylic acids and salts thereof are useful as surfactants and complexing agents for metals, in particular, for calcium.

DETAILED DESCRIPTION OF THE INVENTION

One of the main sources of lignin is from spent pulping liquors, known as black liquor, where lignocellulosic materials, such as wood, straw, corn stalks, bagasse and the like, are processed to separate the cellulose fibers or pulp from the lignin. The lignins employed to make the adducts of the present invention include both alkali lignins from the sulfate pulping process and lignins derived from other alkaline processes, such as the soda or modified soda processes, and sulfonated lignins, such as sulfite lignins from acid and neutral processes, or sulfonated alkali lignins.

Alkali lignins are usually recovered from black liquor as water-insoluble products by acidification and precipitation procedures. Lignin obtained from the kraft, soda or other alkaline processes is not recovered as a sulfonated product, but may easily be sulfonated, if desired, by reacting the product with a bisulfite or sulfite.

In the sulfite pulping process, the lignocellulosic material is digested with a bisulfite or sulfite to obtain a sulfonated black liquor wherein the sulfonated lignin is dissolved. There are several methods of isolating this sulfonated lignin from the other black liquor components, such as carbohydrates and inorganic materials. One method is to precipitate sulfonated lignin as its calcium salt and recover the lignosulfonic acid by addition of sulfuric acid to the calcium salt; thereby, calcium is recovered as calcium sulfate.

By the term "sulfonated lignin", it is meant any lignin containing at least an effective amount of sulfonate groups to solubilize the lignin in water at neutral or acidic conditions. This includes lignins from the sulfite process and sulfonate alkali lignins. Any of the sulfonated lignins may contain up to 50% of the other materials, such as carbohydrates, phenols and other organic or inorganic compounds. The presence of these materials results in larger consumption of the reactants used to form the adducts; therefore, some purification of the lignin starting materials is often desirable.

Since the chemical structure of lignin varies according to its source and treatment, in the following discussion a representation containing a guaiacyl (or syringyl) unit will be used to denote both alkali lignin and sulfonated lignin from whatever source. Possibly only guaiacyl (or syringyl) units are involved in the reaction of the invention. The degree of sulfonation present in the lignin is not a controlling factor in making the adducts.

To prepare the epoxysuccinate, maleic anhydride or maleic acid is hydrolyzed and neutralized with an alkaline metal salt, such as sodium hydroxide, potassium hydroxide, lithium hydroxide, tetramethyl ammonium hydroxide and the like. When sodium hydroxide is used, two moles will neutralize maleic anhydride to obtain a clear sodium maleate solution. Since the epoxidation of the α,β-unsaturated acid prefers an acidic pH, it is desirable that no excess of alkali is used in the neutralization step. The sodium maleate is epoxidized by reacting with hydrogen peroxide at a pH of 4.5 – 6.5 and at a temperature of 60°–65°C., the quantity of the peroxide employed being in the range of 1 to 1.5 moles per mole of maleic acid. A catalyst, such as sodium tungstate, may be used to catalyze the reaction. The amount of sodium tungstate used is usually in the range of 0.2 to 2-mole percent based on the weight of maleic acid. Although the amount of the catalyst used herein is small, it may be recovered for reuse to make the process of the invention more economically attractive. The epoxidation of maleate double bond is extremely rapid, only 1.5 hours being required for complete reaction at 65°C. Sodium epoxysuccinate is obtained in quantitative (over 90%) yields, provided the pH of the epoxidation medium is kept below 6.5.

The sodium epoxysuccinate is directly reacted with lignin, or it may first be concentrated and purified by recrystallization from acetone, and then reacted with lignin. Purification is simply accomplished by pouring the concentrated solution into a quantity of acetone equal to five times its volume; thereby, sodium epoxysuccinate precipitates out as white crystals.

The reaction of lignin and sodium epoxysuccinate may be illustrated by the following equation wherein alkali lignin or lignosulfonic acid is shown as a unit containing a guaiacyl group:

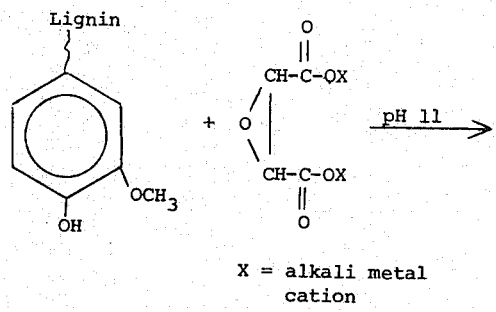

X = alkali metal cation

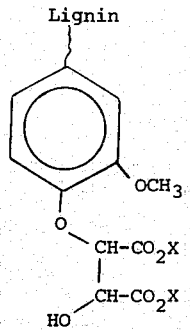

The amount of epoxysuccinate addition and thus water solubility of the lignin dicarboxylate depend, to a large degree, on the molar ratio of epoxysuccinate to lignin under a fixed reaction condition. At least an effective amount of epoxysuccinate is reacted with the lignin. By the term "an effective amount", it is meant an amount of epoxysuccinate sufficient to render alkali lignin soluble in water at neutral or acidic conditions. By varying the relative amount of epoxysuccinate to lignin, adducts havng different characteristics may be obtained. Good water solubility is readily achieved by reacting from 2 to 5 moles of epoxysuccinate per 1,000 grams of lignin, and 10 moles is considered to be the practical limit for economical reasons. Furthermore, amounts of the reactant beyond the maximum value do not increase the water solubility of lignin to a significant degree.

The etherification of lignin by the above reaction is readily effected at temperatures of from 50°C. to 150°C.; however, the preferred temperature is from 100°C. to 150°C. When reaction is performed in water solution, the lignin solution of 10% to 30% solids is simply heated with a desired amount of sodium epoxysuccinate for a period of time ranging from 1 to 3 hours. During the reaction, the pH of lignin solution is maintained at 10.5 to 11.5, preferably 11.0, to minimize the hydrolysis of epoxysuccinate to inactive hydroxysuccinate. The water-soluble lignin dicarboxylate is, if desired, dried by conventional methods, such as spray drying.

The reaction may also be effected in the dry state. Thus, the lignin is first converted to its salt form by mixing with a proper amount of alkali metal hydroxide, preferably sodium hydroxide, in water until a pH value of 10.5 to 11.5, or preferably 11.0, is obtained. The alkaline lignin solution is then dried. The powdered sodium lignate is admixed with a desired amount of sodium epoxysuccinate (a fine white powder) and heated at a temperature of 50°C. to 150°C. for 1 to 4 hours. Better results are usually obtained in the dry state reaction as less hydrolysis of the oxirane rings in epoxysuccinate occurs under this condition.

The lignin dicarboxylates of this invention are anionic surfactants with a precipitation point at as low as pH 2.8 (at 2% solution). Because of their unique carboxylic structure and water solubility, they are useful as dispersants, emulsion stabilizers and metal sequestrants.

The practice of this invention may clearly be seen in the following examples.

EXAMPLE 1

Maleic anhydride (98 grams) was suspended in 300 milliliters of water. To the suspension was added approximately 70 grams of sodium hydroxide until a clear solution was obtained. The temperature of the solution was kept at about 70°C. To the warm solution was added 6.6 grams of sodium tungstate and pH adjusted to 6.5. Hydrogen peroxide (170 grams of 30%) was then added to the solution in one portion, and the reaction temperature was maintained between 60°C.–65°C. The pH of the solution dropped to 6.3 immediately after addition of the peroxide, and the solution turned from brown to colorless after one hour when the pH dropped further to 4.2. Sodium hydroxide was added to bring the pH value up to 4.7 and heating continued for one hour. The solution was cooled to room temperature. One portion of the aqueous solution was poured into four portions of acetone to precipitate the product. The yield of sodium epoxysuccinate was 161.5 grams.

Fifty grams of kraft lignin were slurried in 450 milliliters of water and the pH adjusted to 11.0 with 50% NaOH. The lignin solution was reacted with various molar ratios of the sodium epoxysuccinate in a pressure reactor heated at 140°C. for 2 hours. Upon completion of the reaction, the reactor and contents were cooled to room temperature. A portion of the solution was diluted with water to make up a 2% lignin dicarboxylate solution. The precipitation point (pH) of the lignin adduct was determined by adding dilute hydrochloric acid to the 2% lignin solution until the lignin dicarboxylate precipitated. The pH values at which lignin dicarboxylates of various epoxysuccinate dosages precipitate are shown in the table below.

| Sample Number | Dosage of Epoxysuccinate (moles/1,000 g. lignin) | Precipitation Point, pH | Carboxyl Content (Milliequivalent/Gram) |
|---|---|---|---|
| Blank | 0 | 6.4 | 0.5 |
| 1 | 0.575 | 5.6 | — |
| 2 | 1.15 | 4.7 | — |
| 3 | 2.30 | 3.8 | — |
| 4 | 5.00 | 3.3 | 3.0 |

These results show that the acid solubility of the kraft lignin was improved considerably by addition of epoxysuccinate to the lignin.

EXAMPLE 2

This example demonstrates the extremely low reactivity of unepoxidized maleate with lignin under the reaction condition used in Example 1. 11.2 grams of maleic anhydride (2.3 moles per 1,000 grams of lignin) and 50 grams of kraft lignin were slurried in 300 milliliters of water. To the slurry was added sodium hydroxide until the pH of the solution became 11.0. The mixture was placed in a pressure reactor and heated at 140°C. for 3 hours. The resulting lignin had a precipitation point at pH 6.3 and carboxyl content of 0.52 milliequivalents per gram of lignin. The starting kraft lignin had a precipitation point at pH 6.4 and carboxyl content of 0.50 milliequivalents per gram of lignin.

EXAMPLE 3

50 grams of kraft lignin were reacted with 0.25 mole of sodium epoxysuccinate for 3 hours as in Example 1. The resulting aqueous solution containing the lignin adduct was dialyzed against running tap water overnight using a polyvinyl alcohol membrane. The dialyzate was freeze-dried. The purified lignin adduct contained approximately 2.6 milliequivalents of carboxylic groups per gram of lignin according to potentiometric titration and was water soluble above pH 2.8.

EXAMPLE 4

The dry state reaction of lignin and epoxysuccinate was carried out in the following manner. 100 grams of kraft lignin were slurried in 100 milliliters of water and 32 grams of 50% NaOH were added. The mixture was then freeze-dried. 5 grams of the dry material were placed in a 250-milliliter flask and 0.5 gram of sodium epoxysuccinate was added. The mixture was heated at 120°C.–130°C. under a vigorous stirring with a magnetic stirrer. After 3.5 hours, some water was added and the resulting adduct freeze-dried; and its precipitation point was found to be pH 5.3. The corresponding adduct obtained in aqueous solution according to Example 1 had a precipitation point at pH 5.6.

EXAMPLE 5

50 grams of a commercial sulfonated lignin, having about 2.2 moles of sulfonation per 1,000 grams of lignin, were dissolved in 450 milliliters of water and pH adjusted to 11.0. The solution was placed with 0.115 mole of sodium epoxysuccinate in a pressure reactor and heated at 140°C. for 3 hours.

To evaluate the calcium complexing capacity of this adduct, an experiment was conducted using 2,4-dichlorophenoxyacetic acid (2,4-D) amine salt. 2,4-D, a common pesticide, is insoluble in water in its acid form. When this chemical is converted to its diethylamine salt, however, it becomes water soluble and is readily made into a solution for spraying on agriculture crops. The amine salt is a weak calcium sequestrant (similar to gluconate); and in hard water, it forms insoluble complexes with calcium which plug up pipe lines and hoses used to spray the chemical. In order to solve the problem, a sequestrant is usually added to the 2,4-D amine salt before it is dissolved in hard water. By complexing with the available calcium ions in hard water, the added sequestrant is capable of stopping the formation of the insoluble calcium-2,4-D complex.

Sulfonated lignins usually possess only low calcium complexing capacity, and lignocarboxylate alone forms insoluble calcium-lignin complex. The sulfonated lignin dicarboxylates of this example are unique in that they possess good calcium complexing ability and form water-soluble calcium complex due to the presence of sulfonate groups. To test the efficacy of the product as a retardant of 2,4-D precipitation in hard water, 0.5 gram of the lignin was added to 0.7 milliliter of a commercial concentrated 2,4-D amine salt and 93 milliliters of 2,000 ppm. hard water. The precipitation of insoluble complexes from the lignin and other sequestrants in a 100-milliliter sedimentation tube was observed and recorded in the following table.

| Sequestrant | Sediment (ml.) 20 Min. | 15 Hours | 24 Hours | Remarks |
|---|---|---|---|---|
| None | 12 | — | — | Heavy cloudiness appears immediately |
| Sodium Gluconate | 4 | 5 | — | Cloudiness appears immediately |
| Lignosulfonate | 5 | 6 | 10 | Precipitation occurs immediately |
| Sulfonated Lignin Dicarboxylate of the Invention | 0 | 0 | 0 | Slightly cloudy solution |
| Sodium Citrate | 0 | 0 | 0 | Slightly cloudy solution |

The results show the definite advantage of sulfonated ligno-dicarboxylate over lignosulfonate in forming water-soluble lignin-calcium complexes.

EXAMPLE 6

The lignin dicarboxylic acid of Example 3 is extremely effective in the dispersion of a variety of dyestuffs. The tests for evaluating the dispersing ability and temperature stability of the carboxylic lignin were run in the following manner.

50 grams of a standard commercial disperse dye, Red 1, 35 grams of the lignin and 235 grams of water were ball-milled for 48 hours at a pH of 7.0–7.5 at which time the milled dyestuff was sufficiently dispersed so that a 2.7-milliliter aliquot diluted to 250 milliliters passed completely through a tared No. 4 Whatman filter paper. The paper was dried and reweighed and the milligrams of dyestuff left on the paper were recorded. Then a second 2.7-milliliter aliquot was taken and diluted to 250 milliliters with tap water. With constant stirring, the sample was brought to a boil and held for 15 minutes. The sample was then filtered through a tared No. 4 Whatman filter paper. The paper was dried and weighed and the residual on the paper recorded. The results are compared with that of sulfonated lignin dispersants commonly used in the commercial dispersion of dyestuffs in the table below.

| Dispersant | Dispersion mg. residue | Heat Stability mg. residue |
|---|---|---|
| Invention | 3 | 5 |
| Commercially Available Sulfonated Kraft Lignin | 12 | 85 |

While this invention has been described and illustrated with specific examples and descriptions, it is understood that the invention is not to be limited to the exact details of operation or exact components shown and described herein, as obvious modifications and equivalents will be apparent to those skilled in the art; and the invention is, therefore, to be limited only by the scope within the claims.

What is claimed is:
1. Lignin dicarboxylate comprising,
   the reaction product of lignin and from an effective amount up to about 10 moles of an alkali metal salt of epoxy-succinate per 1,000 grams of lignin.
2. The product of claim 1 wherein said lignin is a sulfonated lignin.
3. The product of claim 1 wherein said lignin is an alkali lignin.
4. The product of claim 3 wherein the lignin is reacted with from 2 to 5 moles of epoxysuccinate.
5. The product of claim 1 wherein said alkali metal salt is sodium.
6. The product of claim 1 in its free-acid form.

* * * * *